United States Patent Office 3,475,416
Patented Oct. 28, 1969

3,475,416
2-OXO-1,2,3,4,5,6-HEXAHYDROBENZOAZOCINE DERIVATIVES
Herbert John Havera, Elkhart, Ind., assignor to Miles Laboratories, Inc., Elkhart, Ind., a corporation of Indiana
No Drawing. Filed Dec. 5, 1966, Ser. No. 598,969
Int. Cl. C07d 41/04
U.S. Cl. 260—239.3                3 Claims

ABSTRACT OF THE DISCLOSURE

A series of 1-substituted derivatives of 2-oxo-1,2,3,4,5,6-hexahydrobenzoazocine in which the substituents at the 1-position is an aminoalkyl radical have been found to have analgetic activity.

---

This invention relates to a series of novel 2-oxo-1,2,3,4,5,6 - hexahydrobenzoazocine derivatives having pharmacological activity.

The compounds of this invention have the following formula:

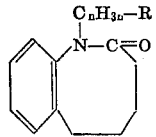

where $n$ is 2 or 3 and R is a tertiary amino radical such as:

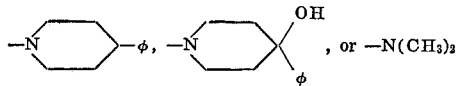

, or $-N(CH_3)_2$

These compounds can be conveniently prepared by reacting a metal derivative of 2-oxo-1,2,3,4,5,6-hexahydrobenzoazocine with a suitable aminoalkyl halide. The metal derivative of the hexahydrobenzoazocine is conveniently prepared from the hexahydrobenzoazocine by treatment with a reactive metal hydride such as sodium hydride. The process of preparation of these compounds is shown in the following equation:

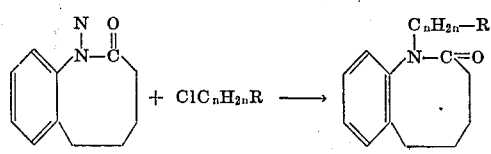

These compounds are useful as analgetic agents and can be suitably formulated as unit dosage forms in the conventional manner. They can be used as the free bases or isolated as their pharmacologically acceptable acid addition salts.

This invention is illustrated in the following examples:

EXAMPLE 1

1-[2-(4-phenyl-4-hydroxy - 1 - piperidyl)ethyl]-2-oxo-1,2,3,4,5,6 - hexahydrobenzoazocine hydrochloride.—To 10.0 g. (0.057 mole) of 1,2,3,4,5,6-hexahydrobenzo [b] azocine-2-one in 100 ml. of xylene was added 3.0 g. of sodium hydride carefully with stirring. The reaction mixture was then refluxed with stirring for 2 hours. To the mixture was then added 3.0 g. of sodium hydride and 19.2 g. (0.06 mole) of 4-phenyl-4-hydroxy-1-(2-chloroethyl) piperidine hydrobromide. The reaction mixture was then refluxed with stirring for 8 hours. After cooling the solution a mixture of water and chloroform was added. The organic layer was removed, washed with water, and dried over magnesium sulfate. The organic solvents were concentrated in vacuo leaving an oily residue. The starting amide was removed by vacuum distillation and the remaining residue weighed 17.0 g.

$\nu_{max.}^{CHCl_3}$ 1645 cm.$^{-1}$ (amide carbonyl)

3600 cm.$^{-1}$ (unassoc. OH), 3400 cm.$^{-1}$ (assoc. OH). The hydrochloride salt was prepared by adding excess hydrochloric acid in isopropanol to the free base in methanol. Upon addition of ether a solid formed which was recrystallized three times from a methanol, ether mixture.
Yield 3.5 g., M.P. 237°–238°.
Analysis.—Calcd. for $C_{24}H_{31}ClN_2O_2$: C, 69.47; H, 7.53; N, 6.75. Found: C, 68.98; H, 7.84; N, 6.78.

EXAMPLE 2

1-[2-(4-phenyl - 1 - piperidyl)ethyl]-2-oxo-1,2,3,4,5,6-hexahydrobenzoazocine hydrochloride.—To 12.0 g. (0.07 mole) of 1,2,3,4,5,6-hexahydrobenzo [b] azocine-2-one in 100 ml. of xylene was added 4.0 g. of sodium hydride carefully with stirring. The reaction mixture was then refluxed with stirring for 2 hours. The solution was cooled and 4.0 g. of sodium hydride and 18.0 g. (0.07 mole) of 4-phenyl-1-(2-chloroethyl) piperidine hydrochloride was added. The reaction mixture was then refluxed with stirring for 6 hours. After cooling the solution, a mixture of water and chloroform was added. The organic layer was removed, washed with water, and dried over magnesium sulfate. The organic solvents were concentrated in vacuo leaving an oil which was distilled under reduced pressure. A fraction was collected at 217°–220° at 1 mm.
Yield 15.5 g.

$\nu_{max.}^{CHCl_3}$ 1645 cm.$^{-1}$ (amide carbonyl)

The hydrochloride salt was prepared by adding excess hydrochloric acid in isopropanol to the free base in methanol. Upon addition of ether a solid formed which was recrystallized from a methanol, ether mixture three times.
Yield 5.0 g., M.P. 225°–227°.
Analysis.—Calcd. for $C_{24}H_{31}ClN_2O$: C, 72.24; H, 7.81; N, 7.00. Found: C, 71.92; H, 8.00; N, 6.97.

In summary, this invention provides a series of 1-substituted derivatives of 2-oxo-1,2,3,4,5,6-hexahydrobenzoazocine which are useful as analgetic agents.

What is claimed is:
1. A compound of the formula

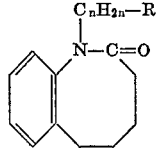

where $n$ is 2 or 3 and R is

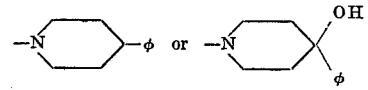

or a pharmacologically acceptable acid addition salt thereof.

2. A compound according to claim 1 which is 1-[2-(4-phenyl-4-hydroxy - 1 - piperidyl)ethyl]-2-oxo-1,2,3,4,5,6-hexahydrobenzoazocine.

3. A compound according to claim 1 which is 1-[2-(4-phenyl - 1 - piperidyl)ethyl]-2-oxo-1,2,3,4,5,6-hexahydrobenzoazocine.

References Cited

FOREIGN PATENTS 6,514,240  5/1966  Netherlands.

OTHER REFERENCES

Evans et al.: J. Chem. Soc. (1965), pp. 4806–4812 (September).

HENRY R. JILES, Primary Examiner

R. T. BOND, Assistant Examiner

U.S. Cl. X.R.

424—244, 267